United States Patent [19]

Austin et al.

[11] 4,354,935

[45] Oct. 19, 1982

[54] APPARATUS FOR THICKENING SLUDGE

[75] Inventors: Eric P. Austin, Sandbach; Howard J. Worrall, Kidsgrove, both of England

[73] Assignee: Simon-Hartley Limited, Stoke-on-Trent, England

[21] Appl. No.: 222,661

[22] Filed: Jan. 5, 1981

[30] Foreign Application Priority Data

Jan. 23, 1980 [GB] United Kingdom ............... 8002271

[51] Int. Cl.³ .......................................... B01D 33/04
[52] U.S. Cl. .................................... 210/396; 210/400
[58] Field of Search ........................ 210/396, 400, 401

[56] References Cited

U.S. PATENT DOCUMENTS 3,891,549 6/1975 Carmel et al. ................. 210/400 X
3,984,329 10/1976 Wenzel et al. ................. 210/400 X Primary Examiner—Thomas G. Wyse
Attorney, Agent, or Firm—LeBlanc, Nolan, Shur & Nies

[57] ABSTRACT

Apparatus for thickening sludge comprising a driven foraminous belt (10) having a conveying surface arranged at least substantially horizontally, a chute (14) for feeding a matt of sludge onto the belt (10) at one end of the conveying run, and a plurality of parallel flexible strips (21) of material attached at one end to the output end of the chute (14) and allowed to rest freely upon the belt (10) at the other end, whereby the sludge passes onto the belt in one or more strips whose width is substantially less than that of the belt, thus to leave one or more zones of the belt free of sludge to permit drainage of water therefrom through the belt, there being a plurality of deflecting members (22) disposed downstream of the output ends of the strips (21) and adapted to deflect a portion of each strip of sludge onto the next adjacent part of the belt left free of sludge thus to produce a matt thereof of substantially uniform thickness extending across the belt.

6 Claims, 5 Drawing Figures

FIG.3
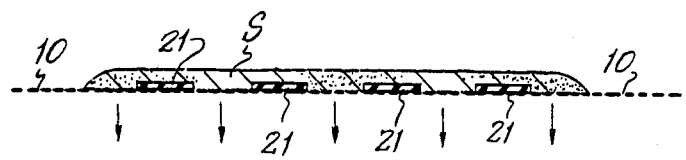
FIG.4
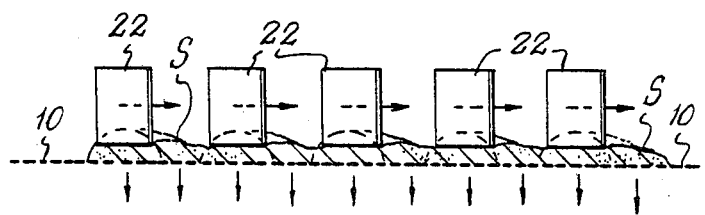
FIG.5

APPARATUS FOR THICKENING SLUDGE

THIS INVENTION concerns apparatus for thickening sludge particularly, though by no means exclusively, activated sludge.

In many cases, activated sludge is thickened by passage through a settling tank such that the residence time in the tank is of the order of 24 hours. This technique, besides requiring much time and large equipment, has the disadvantage that the thickened sludge will have a solids concentration of about 1.5 to 2% by weight.

With a view to obtaining higher levels of solids in the concentrated sludge, various techniques have been developed utilising sophisticated equipment such as flotation apparatus where suspended solids contained within the sludge are carried to the surface by small bubbles of gas, produced by electrolytic action.

Such flotation apparatus is effective in removing water from the sludge so that the concentrated sludge will have perhaps 5% solids by weight, or thereabouts. This technique has a number of disadvantages in that the equipment used is costly to purchase and maintain and that the processing costs are high.

An object of the present invention is to provide a system for thickening sludge to obtain a concentration of solids in the order of 5% by weight, with simple equipment and in an economic manner.

According to the present invention there is provided apparatus for thickening sludge, comprising a driven foraminous belt having a conveying run arranged at least substantially horizontally, a chute for feeding a mat of sludge onto the belt at one end of the conveying run, and means for causing the sludge to pass onto the belt in one or more zones whose width is substantially less than that of the belt, thus to leave one or more other zones of the belt free of sludge to permit drainage of water therefrom through the belt.

Preferably, said means comprises a plurality of flexible strips attached to and extending from the output end of the feed chute in the direction of travel of the belt, part way along the latter, the said strips being spaced apart thus to cause sludge to be fed onto the belt in a number of discrete parallel paths.

The invention will be further apparent from the following description with reference to the accompanying drawings which show, by way of example only, one form of apparatus embodying the invention.

Of the drawings:

FIG. 3 shows a section taken along line III—III of FIG. 1;

FIG. 4 shows a section taken along line IV—IV of FIG. 1;

Figure 1:
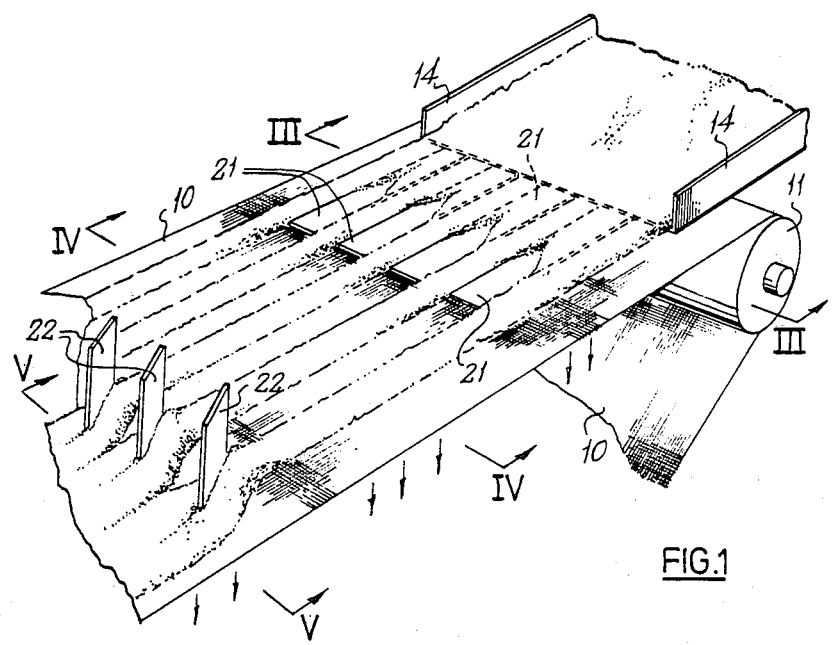
FIG. 1 shows a perspective view of sludge thickening apparatus made in accordance with the invention.
Figure 2:
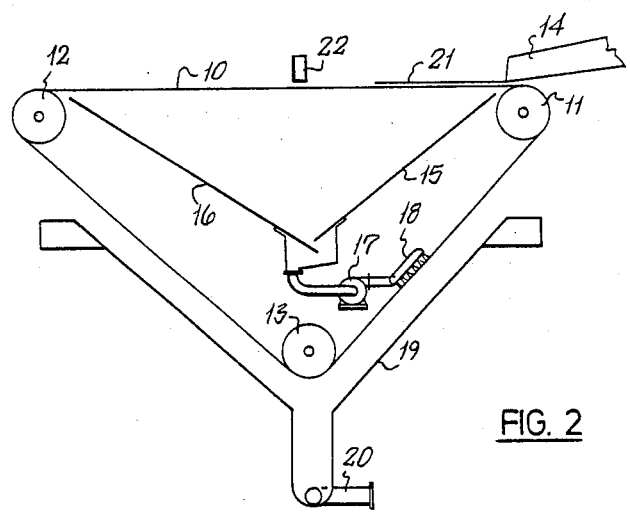
FIG. 2 shows a side elevation of the apparatus.

and FIG. 5 shows a section taken along line V—V of FIG. 1.

Referring now to the drawings, the apparatus generally comprises a mesh conveying belt 10 driven by or wrapped around rollers 11, 12 and 13 and having a conveying run between rollers 11 and 12 of approximately 3 meters. The sludge to be thickened is delivered onto one end of the belt by a chute 14, and water which drains from the sludge through the belt 10 is collected by guide plates 15 and 16 and delivered to a pump 17 which supplies at least some of the drained water to one or more spray nozzles 18 which serve to wash any residual solids from the belt for further collection by a trough 19 from which the liquid and any residual solids are removed via a drainpipe 20 for disposal.

Attached to and extending from the delivery end of the feed chute 14 are a plurality of spaced parallel flexible strips 21 of a material such as rubber, which extends from the end of the feed chute 14 for approximately 1 to 2 meters in the direction of travel of the belt 10.

As sludge S to be thickened is fed towards the belt 10 on the chute 14, those zones of the belt 10 which pass beneath the strips 21 remain free of sludge as can be seen from FIG. 4, the sludge passing along the strips tending to fall to each side thereof thus to be fed onto those zones of the belt where the sludge is delivered direct from the feed chute. The length of the strips 21 is selected to ensure that the sludge deposited onto the strips from the feed chute falls into the zones of the belt occupied by the sludge and does not pass into those zones left free. At a certain distance downstream of the end of the flexible strips 21, there are provided a number of ploughs 22 disposed above the surface of the belt and aligned with the paths of sludge. These ploughs serve to deflect the uppermost portion of each path of sludge lying on the belt, onto those parts left free by the strips 21. It will be appreciated that the ploughs 22 are located sufficiently far downstream of the delivery position of the sludge onto the belt, for the first flush of free water to be drained from the sludge before reaching the ploughs. Thus, for the remainder of the conveying run of the belt 10 the sludge is formed into a mat of substantially uniform thickness throughout the width of the belt to permit drainage of residual water through the sludge during the remainder of the conveying run. This condition is illustrated in FIG. 5.

With the arrangement described herein it has been found that a greater concentration of solids can be achieved in the final sludge, when compared with that achieved using systems where no portions of the belt are left free of sludge during the initial flush of water or where a series of ploughs in contact with the belt close to the feed chute are used to establish free areas. In the latter case the ploughs while preventing residence of sludge in certain areas of the belt creates a spreading action by virtue of their contact with the belt thus forcing solids into the interstices of the belt which of course reduces the ability of the belt readily to permit drainage.

What is claimed is:

1. Apparatus for thickening sludge comprising a driven foraminous belt having a conveying run arranged at least substantially horizontally, a chute for feeding a mass of sludge onto the belt at one end of the conveying run, and a plurality of generally parallel strips attached to and extending from the output end of the feed chute in the direction of travel of the belt, part way along the latter, the strips resting freely on the belt and being spaced apart thus to cause sludge to be fed onto the belt in a number of discrete parallel paths and thus to leave a plurality of zones of the belt free of sludge to permit drainage of water from the parallel paths of sludge through the belt.

2. Apparatus according to claim 1, wherein said strips are of a flexible material and are disposed to extend in parallel relationship from the output end of said chute.

3. Apparatus according to claim 1, including a plurality of deflecting members disposed above the surface of the belt and aligned thereon with the paths into which the sludge is caused to pass, said members serving to deflect a portion of each so-formed path of sludge lying on the belt, into those zones left free by the said strips.

4. Apparatus according to claim 3, wherein said deflecting members are fixed downstream of said strips in the direction of travel of the belt and disposed at an angle with repsect to said direction of travel thus to produce, downstream thereof, a matt of sludge of substantially uniform thickness across the belt.

5. Apparatus according to claim 4, wherein said deflecting members are disposed with their lowermost edges above the belt at a height substantially equal to half of the thickness of sludge released onto the belt from said chute.

6. Apparatus according to claim 3, wherein the distance between the output end of said chute and said deflecting members is such as to allow the first flush of free water to be drained from the surface of the sludge before it reaches said members.

* * * * *